(12) United States Patent
Sorreles et al.

(10) Patent No.: US 7,552,504 B1
(45) Date of Patent: Jun. 30, 2009

(54) APPARATUS AND METHOD FOR CLEANING WELDING NOZZLES

(75) Inventors: George W. Sorreles, Bellefontaine, OH (US); Joel Valdez, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 502 days.

(21) Appl. No.: 11/278,171

(22) Filed: Mar. 31, 2006

(51) Int. Cl.
*A47L 5/12* (2006.01)
*B23K 9/29* (2006.01)

(52) U.S. Cl. .......................... 15/316.1; 15/89
(58) Field of Classification Search ............... 15/316.1, 15/89–91; 409/140; 134/22.18, 52, 53, 157
See application file for complete search history.

(56) References Cited

U.S. PATENT DOCUMENTS

| | | | | |
|---|---|---|---|---|
| 1,373,871 A | * | 4/1921 | Dutton | 15/104.04 |
| 3,343,986 A | * | 9/1967 | Howery et al. | 134/6 |
| 4,002,491 A | * | 1/1977 | Esparza | 134/6 |
| 4,472,852 A | * | 9/1984 | Dill | 15/91 |
| 4,557,009 A | * | 12/1985 | Dill | 15/4 |
| 4,771,577 A | | 9/1988 | Abe et al. | |
| 4,856,949 A | | 8/1989 | Shimada | |
| 5,993,125 A | | 11/1999 | Shimada | |
| 6,186,876 B1 | | 2/2001 | Christiansen | |
| 6,231,430 B1 | * | 5/2001 | Dill | 451/54 |
| 6,273,317 B1 | | 8/2001 | Arai et al. | |
| 6,422,925 B2 | * | 7/2002 | Dill | 451/54 |
| 6,863,597 B2 | | 3/2005 | Sunaga et al. | |
| 2005/0029326 A1 | | 2/2005 | Henrikson | |
| 2005/0211684 A1 | * | 9/2005 | Jaeger et al. | 219/125.1 |

* cited by examiner

*Primary Examiner*—David B Thomas
(74) *Attorney, Agent, or Firm*—Rankin, Hill & Clark LLP; Vincent Ciamacco

(57) ABSTRACT

A welding nozzle cleaning device includes a rotary hub and a plurality of flexible arms that extend outwardly from the hub. Each arm is formed of flexible resilient material and has an impact head at its distal end, the head being carried by the hub-and-arm assembly through a circular path of travel. As a welding nozzle to be cleaned is moved toward the cleaning device, the nozzle actuates a valve so as to provide pressurized air to the cleaning device, driving the head in the circular path, and to the welding nozzle, to blow dislodged material out of the nozzle. The arm is tubular and is bent so that its distal end defines an exhaust port that extends tangentially relative to the hub axis so that pressurized air passing through arm and out of the exhaust port drives the arms and hub about the hub axis.

15 Claims, 2 Drawing Sheets

APPARATUS AND METHOD FOR CLEANING WELDING NOZZLES

BACKGROUND OF THE INVENTION

1. Field of the Invention

The present invention generally relates to welding processes that use a metallic core material and a flow of inert gas to prevent oxidation and, more particularly, relates to an apparatus and method for automatically cleaning deposits of metallic core material that accumulate on the surfaces of a welding nozzle during welding operations.

2. Description of Related Art

In vehicle manufacturing processes, the equipment used for automatically welding body and frame components generally uses a metallic core material that is fed progressively to the weld site. An inert gas is projected around the weld site to prevent oxidation. This process is commonly referred to as "MIG" welding.

The welding device is usually carried by a robotic mechanism that positions the welding head sequentially at various weld sites. The welding and positioning are controlled automatically at a central control station. An operator, who may make periodic adjustments as necessary, monitors the system.

After the welding device has performed a certain number of operations on components moving along an assembly line, an operator must manually clean the welding nozzle to remove deposits of metallic core material that accumulate on nozzle surfaces. To do this, the operator generally taps the nozzle with some type of impact tool, such as a small hammer, to dislodge accumulated deposits. This is followed by removing the dislodged particles from the vicinity of the nozzle such as by using a blast of air generated by a commonly available air pressure system. While this is being done, another worker may continue the assembly line welding functions manually.

In a typical situation the cleaning function must be accomplished after the welding device has performed its welding cycle about 60 times. The time necessary for manual cleaning may add up to about 50 minutes a day in a typical situation. This diverts the operator from other tasks vital to the manufacturing process and requires the use of another worker to fill in with manual welding for a period of time until the automatic equipment can be put back on line.

It is therefore desirable that an apparatus and method be provided for performing this cleaning operation automatically without interrupting assembly line operations.

SUMMARY OF THE INVENTION

In accordance with the apparatus and method of the invention, the periodic cleaning of metallic deposits of core material from a welding nozzle is accomplished automatically at predetermined intervals quickly and effectively in between welding operations without interrupting the welding cycle. The apparatus includes a hub and a drive means for rotating the hub about its axis. The hub has at least one flexible resilient arm mounted thereon, that extends outwardly relative to the hub axis. An impact head is mounted on the distal end of the arm so that rotation of the hub carries the impact head through a circular path of travel.

When a cleaning operation is to be performed, the welding nozzle is automatically positioned in the path of the impact head so that the head taps the nozzle repeatedly to dislodge deposits of core material. With each tap, the flexible resilient arm flexes to permit the impact head to deflect sufficiently to clear the nozzle and continue around its circular path.

In a preferred form of the invention, the arm is formed so that its distal end portion extends at least somewhat tangentially relative to the hub axis and an air passage is formed in the arm. The passage terminates at an outlet port at the distal end of the arm and the opposite end of the passage communicates with an air pressure source. The pressure source produces a flow of air through the passage and out through the outlet port. Thus, the reaction force produced by the exhausting air drives the hub about its axis.

To obtain dynamic balance for the apparatus, two or more flexible arms should be mounted on the hub at uniformly spaced locations. Four arms are particularly advantageous.

In accordance with another feature of the invention, a flow of air produced by the air pressure source is directed through the nozzle during the tapping operation to blow dislodged particles of core material away from the nozzle. Further, a pneumatic valve is operated or actuated by the welding nozzle so that the air flow to the impact heads and through the welding nozzle is automatically initiated and discontinued by movement of the nozzle into and out of the cleaning position.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
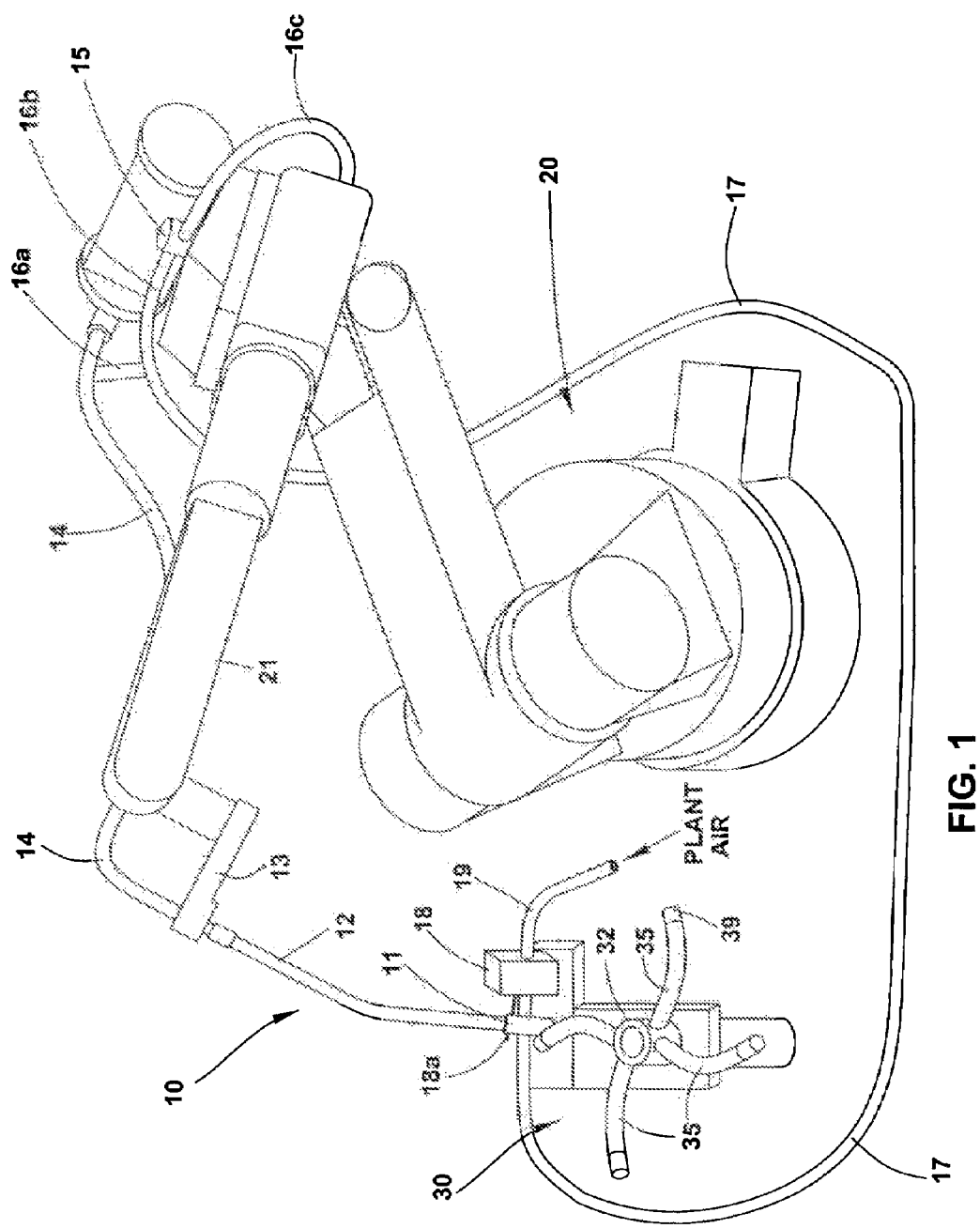
FIG. 1 is a perspective view showing the nozzle cleaning apparatus of the invention used in association with a welding device carried by a robotic mechanism, for use on a typical assembly line for vehicle bodies and frames; and, FIG. 2 is a perspective view, similar in orientation to FIG. 1 but on a larger scale showing the apparatus performing a cleaning operation on a welding nozzle.

Referring more particularly to the drawings and initially to FIG. 1, there is shown a welding device 10 carried by a robotic mechanism 20 and a cleaning device 30 mounted in a suitable position for performing a periodic cleaning operation on the nozzle 11 of the welding mechanism. The nozzle 11 has an opening therein and is carried on a tubular arm 12. An inert gas is directed through the tubular arm 12 and nozzle 11 so as to flow around the welding site during the welding process. The tubular arm 12 is attached to the robotic mechanism by means of a bracket 13.

The flow of inert gas to the tubular arm 12 is supplied through a flexible tube 14 that is connected to a solenoid-operated control valve 15 via supply lines 16a, 16b. The solenoid valve 15 receives inert gas via an inert gas supply line 16c. An air supply line 17 for air from a pressure source is connected to the supply line 16a and flexible tube 14. The air supply line 17 is connected to an output of a pneumatic valve 18 that receives air under pressure from a main air supply line 19 and supplies the pressurized air to the nozzle 11 and the nozzle cleaning apparatus 30, describe hereinafter. Accordingly, either inert gas or pressurized air is supplied to the welding nozzle 11, as will be apparent from the following discussion.

The operation of the robotic mechanism 20 is controlled by a computer system (not shown) located at a remote position and monitored by an operator. The control system moves the welding device 10, which is connected to the robot arm 21, automatically through predetermined welding cycles that are repeated as each component moves along the assembly line past the respective station.

As indicated above, deposits of metallic core material accumulate on the nozzle 11 after a number of welding cycles and must be periodically removed. This cleaning process is the focus of the present invention. The apparatus 30 is adapted to perform this cleaning process automatically at predetermined intervals in between welding cycles.

The nozzle cleaning apparatus 30 includes a base plate 31 and a hub 32 mounted with its axis perpendicular to the base plate. The hub 32 has an axial passage therein and is mounted for free rotation. An air supply line 33 extending from the valve 18 is connected to the base plate 31 so that the air passage through the line 33 communicates with the air passage in the hub 32.

Figure 2:
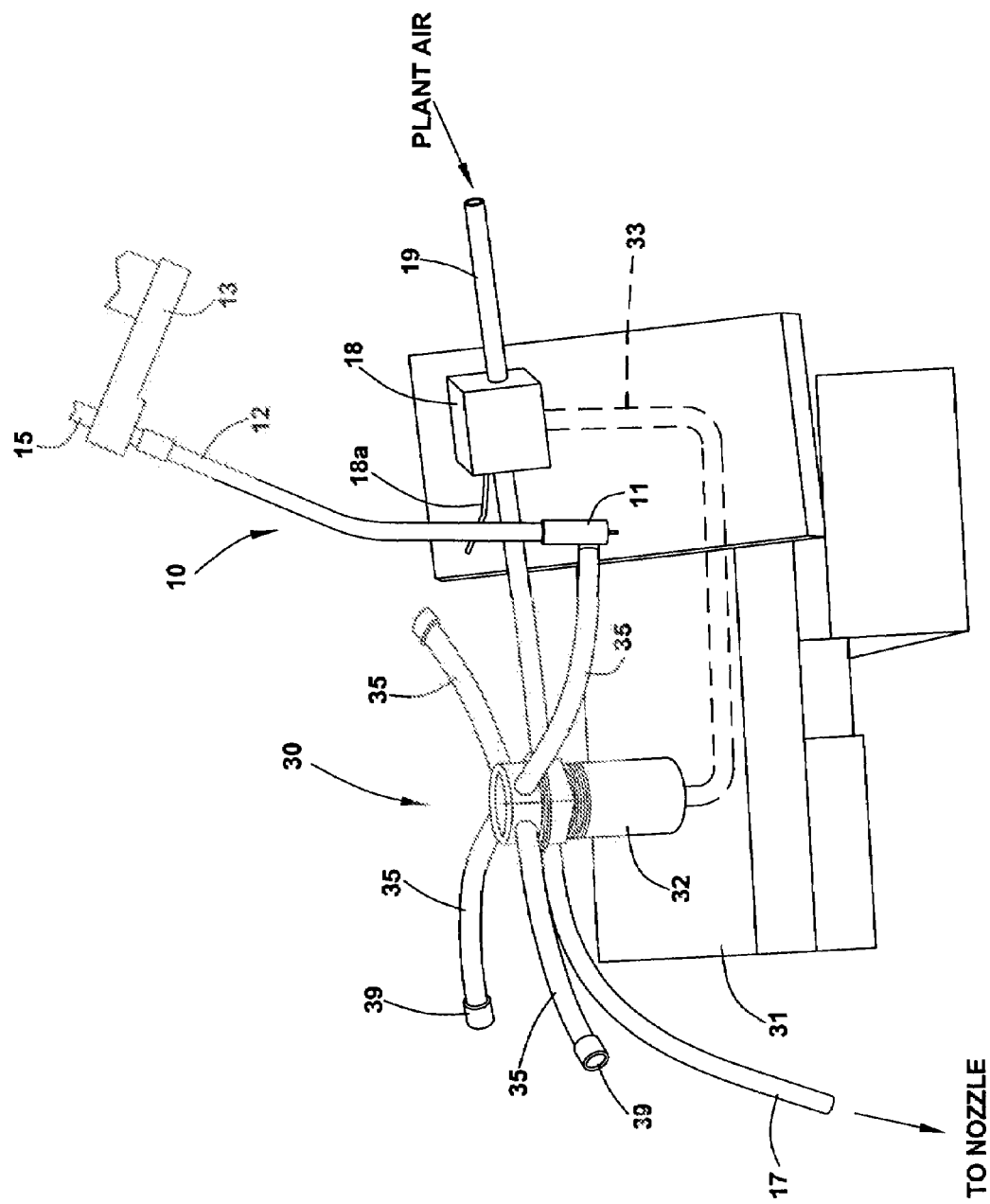

Four flexible resilient arms 35 are mounted on the hub 32 in symmetrical relation about the hub axis as shown in FIG. 2. The arms 35 are substantially identical to one another. Each of the arms 35 is tubular and defines an air passage therethrough. Flexible tubing, which may be fiber reinforced plastic or other suitable material, is preferably used to form the arms 35. The arms 35 are so connected to the hub 32 that their air passages communicate with the air passage in the hub 32 so that air flowing through the line 33 and the hub air passage is directed into and through the arms 35, as will be apparent from the following description.

A proximal end of each arm 35 extends outwardly in a generally radial direction relative to the hub axis. Each arm 35 is bent into a curved shape as shown in the drawings, such that the distal end of each arm 35 extends in a direction tangential to the hub axis.

The distal end of each arm 35 holds an impact head 39, the head having a suitable shape and weight for striking or tapping the nozzle 11 to dislodge accumulations of metal core material. Preferably, the head 39 is at least partially received in the distal end of the arm, and extends from the arm 35. As such, the impact head 39 defines a terminal end of each arm 35.

The impact heads 39 are hollow and define an outlet port for the air passage in the associated arm 35. Threaded steel nuts or hollow bolts, readily available, have been found to be particularly suitable for use as impact heads 39.

When pressurized air is supplied to the passage in the hub 32 through the air supply line 33, the air flows outwardly through the passages in the arms 35 and is then exhausted through the outlet ports provided by the impact heads 39. The resulting reaction force causes rotation of the arm-and-hub assembly about the hub axis. As a result, the impact heads 39 move in a circular path of travel.

The valve 18 preferably includes an arm or lever 18a that serves as an actuator or switch. Preferably, the arm or lever 18a extends outwardly from the valve 18 so as to be disposed in a position that the nozzle 11 will engage as the nozzle moves into and out of the cleaning position defined by the circular path of travel of the impact heads 39. More specifically, the nozzle 11 will engage the arm or lever 18a to open the valve and provide pressurized air to the cleaning apparatus 30 and the nozzle 11 as the nozzle is moved into the cleaning position. Provision of pressurized air to the cleaning apparatus 30 causes the hub 32 and arms 35 to rotate about the hub axis, and thereby bring the impact heads 39 into striking engagement with the nozzle 11. Provision of pressurized air to the nozzle 11 blows any dislodged particles out of the nozzle 11. Following a cleaning procedure, movement of the nozzle 11 out of the cleaning position will again actuate the lever 18a so as to close the valve 18 and discontinue supply of pressurized air to the cleaning apparatus 30 and the nozzle 11.

The nozzle cleaning process is performed after a predetermined number of welding operations have been completed, or may be determined by an operator based on observation of the accumulation of metallic core material produced by a certain number of cycles. Preferably, the nozzle cleaning process is one step in an automated welding process or cycle.

To initiate the procedure, the control system actuates the robotic mechanism 20 to move the nozzle 11 toward the cleaning position. As the nozzle approaches the cleaning position, the nozzle 11 engages the arm 18a to actuate the valve 18 and supply pressurized air to the cleaning apparatus 30 and to the nozzle 11. The flow of pressurized air to the cleaning apparatus 30 rotatably drives the hub 32 and arms 35, and thereby drives the impact heads 39 about their circular path of travel. The flow of pressurized air to the nozzle 14 via the flexible tube 14 and supply lines 16a, 17 serve to propel dislodged particles out of the open end of the nozzle 11. At the same time or earlier, the control system actuates the solenoid valve 15 to cut off the flow of inert gas to the nozzle 11.

When the nozzle 11 is in the cleaning position as shown in FIG. 2, the rotating impact heads 39 to strike or tap the nozzle 11 to dislodge accumulations of core material therefrom. The impact between the head 39 and the nozzle 11 causes the associated arm 35 to flex in a manner that permits the respective impact head 39 to deflect and slide over the nozzle so as to clear the nozzle 11. Thus, rotation of the arm-and-hub assembly will continue and a progression of the impact heads 39 will strike or tap the nozzle 11.

This tapping need only continue for a few seconds to complete the cleaning procedure. Naturally, the speed of rotation of the hub 32 and the impact force of the heads 39 on the nozzle 11 is simply adjustable by altering the pressure/volume of air supplied to the hub 32. As noted previously, simultaneously with the tapping of the nozzle 11, pressurized air flows through the nozzle 11 to blow dislodged particles out of the nozzle 11.

When cleaning is completed, the control system causes the robotic mechanism to move the welding nozzle on to its next welding cycle. As the welding nozzle 11 is moved out of the cleaning position, the nozzle 11 engages the lever 18a to actuate the pneumatic valve 18 so as to discontinue the supply of pressurized air to the cleaning apparatus 30 and the nozzle 11. At the same time, or at some prescribed time thereafter, the control system actuates the solenoid valve 15 to reestablish the flow of inert gas to the nozzle 11.

While the invention has been shown and described with respect to a specific embodiment thereof, this is intended for the purpose of illustration rather than limitation and other variations and modifications will be apparent to those skilled in the art, all within the intended spirit and scope of the invention. For example, although not preferred due to cost and complexity issues, it is contemplated that the supply of pressurized air could be entirely computer controlled and accomplished via solenoid valves, rather than the nozzle-actuated valve of the present invention. Further, it is contemplated that the valve of the present invention could be timer-controlled such that, once actuated, the valve would remain open for a predetermined period of time corresponding to a cleaning cycle and thereby eliminating the need to manually actuate (close) the valve. Thus, it should be appreciated that, with the knowledge and teaching of the present invention as embodied in the present application, numerous modifications and improvements are possible. Accordingly the patent is not to be limited in scope and effect to the specific device herein shown and described nor in any other way that is inconsistent with the spirit and scope of the invention.

What is claimed is:

1. An apparatus for cleaning deposits of metallic core material from a welding nozzle, comprising:

a hub;

a drive device for rotating the hub;

at least one flexible resilient arm secured to and extending outwardly from the hub;

an impact head mounted on the distal end of the arm so that rotation of the hub carries the head through a circular path of travel such that, when a welding nozzle is disposed in the path of travel of the head, the head taps the nozzle to dislodge deposits of core material therefrom; and a source of pressurized air to supply a flow of air through and outwardly from the nozzle to blow dislodged particles of core material away from the nozzle.

2. The apparatus as defined in claim 1, wherein, when impact head taps the nozzle, the arm flexes sufficiently to permit the head to deflect away from the nozzle momentarily and continue about the circular path.

3. The apparatus as defined in claim 1, comprising a plurality of the flexible resilient arms mounted symmetrically around the hub.

4. The apparatus as defined in claim 3, comprising four flexible resilient arms.

5. An apparatus for cleaning deposits of metallic core material from a welding nozzle, comprising:

a hub;

a drive device for rotating the hub;

at least one flexible resilient arm secured to and extending outwardly from the hub; and an impact head mounted on the distal end of the arm so that rotation of the hub carries the head through a circular path of travel such that, when a welding nozzle is disposed in the path of travel of the head, the head taps the nozzle to dislodge deposits of core material therefrom, wherein a distal end portion of the arm extends tangentially relative to an axis of the hub, and wherein the arm is tubular and defines an air passage with an outlet port at the distal end of the arm, and wherein the drive device includes a source for supplying pressurized air to the hub and thereby producing a flow of air through the air passage and out of the outlet port to rotate the hub about its axis.

6. The apparatus as defined in claim 5, wherein the impact head defines the outlet port for the air passage.

7. The apparatus as defined in claim 5, wherein the pressurized air from the pressurized air source is also directed through and outwardly from the nozzle to blow dislodged particles of core material away from the nozzle.

8. The apparatus as defined in claim 7, further comprising a pneumatic valve that controls supply of pressurized air from the pressurized air source to the nozzle and to the hub.

9. The apparatus as defined in claim 8, wherein the pneumatic valve includes an actuator that is positioned so as to be engaged by the nozzle as the nozzle moves toward the arms so as to open the pneumatic valve and supply pressurized air to the nozzle and to the hub, and to be engaged by the nozzle as the nozzle moves away from the arms so as to close the pneumatic valve and discontinue the supply of pressurized air to the nozzle and hub.

10. The apparatus as defined in claim 5, wherein, when impact head taps the nozzle, the arm flexes sufficiently to permit the head to deflect away from the nozzle momentarily and continue about the circular path.

11. The apparatus as defined in claim 5, comprising a plurality of the flexible resilient arms mounted symmetrically around the hub.

12. The apparatus as defined in claim 11, comprising four flexible resilient arms.

13. A method for automatically cleaning deposits of metallic core material from a welding nozzle comprising the steps of:

moving an impact head successively in a circular path of travel, automatically moving the nozzle into the path of travel of the impact head so that the impact head taps the nozzle during each pass to dislodge deposits of core material from the nozzle, the impact head being adapted to deflect upon each tap, sufficiently to clear the nozzle, and simultaneously directing pressurized air through and outwardly from the nozzle to blow dislodged particles of core material away from the nozzle.

14. The method of claim 13, wherein said step of automatically moving further comprises the step of:

actuating a valve with said nozzle so as to supply pressurized air to a cleaning apparatus, which comprises said impact head, and to said nozzle.

15. The method of claim 14, comprising the further step of moving said nozzle so as to actuate the valve and thereby discontinue the supply of pressurized air to said cleaning apparatus and said nozzle.

* * * * *